US009165167B1

(12) United States Patent
Friesel

(10) Patent No.: US 9,165,167 B1
(45) Date of Patent: Oct. 20, 2015

(54) ACOUSTIC DECOY SYSTEM TO CONCEAL SHOOTER LOCATION

(75) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 913 days.

(21) Appl. No.: 13/401,301

(22) Filed: Feb. 21, 2012

(51) Int. Cl.
*G06F 19/00* (2011.01)
*G06G 7/80* (2006.01)

(52) U.S. Cl.
CPC .......................................... *G06G 7/80* (2013.01)

(58) Field of Classification Search
CPC .............. G06Q 7/80; G06Q 1/14; F41G 3/06; F41G 5/14; F41G 11/00
USPC ............................ 235/407, 404, 418; 446/405
IPC .................... G06G 7/80, 1/14; F41G 3/06, 5/14, F41G 11/00
See application file for complete search history.

(56) References Cited

U.S. PATENT DOCUMENTS

2012/0329364 A1* 12/2012 Botten .......................... 446/405

* cited by examiner

*Primary Examiner* — Karl D Frech
(74) *Attorney, Agent, or Firm* — Howard IP Law Group, PC

(57) ABSTRACT

An acoustic system is disclosed to help conceal the location of a shooter. The system comprises one or more acoustic decoys and an activating module for sending one or more triggering signals from a weapon to the acoustic decoys. The acoustic decoy comprises a processor, a sound generating module capable of producing a weapon discharge sound, and a receiver connected to an antenna. The decoy processor causes the sound generating module to produce a weapon discharge sound when the receiver receives a triggering signal through the antenna. The activation module comprises an activation processor, an imminent discharge sensor for sensing motion indicative of an imminent weapon discharge, a signal generator, and a transmitter. The activation processor causes the signal generator to generate a triggering signal when the imminent discharge sensor senses an imminent weapon discharge and causes the transmitter to send the triggering signal to the acoustic decoy.

26 Claims, 4 Drawing Sheets

ACOUSTIC DECOY SYSTEM TO CONCEAL SHOOTER LOCATION

FIELD OF THE INVENTION

The present invention relates to an acoustic decoy apparatus, system, and method to conceal the location of a shooter.

BACKGROUND OF THE INVENTION

Systems and devices exist that can locate the position of a shooter by acoustic or ultrasonic means. For example, a stationary or mobile acoustic location system with multiple listening devices can determine the location of a weapon's discharge by acoustic means. An observation post protecting a target can use human or electronic acoustic means to identify the location from which a weapon has been discharged.

Currently, silencers or frequency shifters may be used to try to conceal the location of a shooter. Silencers are not ideal because they are heavy and affect the balance of the weapon. In addition, they do not completely mask the discharge sound made by a shooter, particularly when supersonic ammunition is used that creates a noise when the bullet breaks the sound barrier. Frequency shifters are not ideal because they are also heavy and affect the balance of the weapon. In addition, because frequency shifters merely change the frequency of the recoil sound, acoustic sensors can be designed that listen for recoil in known shifted frequencies.

Thus, alternatives are desired to help conceal the location of a shooter against the systems and devices that exist for locating shooters.

SUMMARY OF THE INVENTION

An acoustic decoy system is disclosed that comprises one or more acoustic decoys capable of producing weapon discharge sounds and an activation module having an imminent discharge sensor for sensing movement indicative of an imminent discharge of a weapon. The activation module sends one or more triggering signals from the weapon to the one or more acoustic decoys after the imminent discharge sensor senses movement indicative of the imminent discharge of the weapon, thereby causing the one or more acoustic decoys to produce the weapon discharge sounds. In an embodiment, at least one of the one or more acoustic decoys comprises a decoy processor; a digital waveform module; an amplifier; a speaker; and a receiver connected to an antenna. The decoy processor causes a weapon discharge sound digital waveform from the digital waveform module to be amplified by the amplifier and then played over the speaker when the receiver receives one of the one or more triggering signals through the antenna. The digital waveform module may have a plurality of digital waveforms, each waveform corresponding to a different weapon discharge sound, and the one or more acoustic decoys may further comprise a selector for selecting the weapon discharge sound to be played when one of the one or more triggering signals is received. The digital waveform module may also comprise a first sound for mimicking distance effects or a second sound producing a deliberate incorrect location of a shooter.

In an embodiment, the one of the one or more acoustic decoys comprises: a decoy processor; a chamber to receive a blank cartridge; a firing mechanism; and a receiver connected to an antenna. The decoy processor causes the firing mechanism to discharge the blank cartridge in the chamber when the receiver receives one of the one or more triggering signals through the antenna. The at least one, of the one or more acoustic decoys, may further comprise a magazine for holding a plurality of blank cartridges.

The activation module may further comprise an activation processor, a signal generator, and a transmitter. The activation processor causes the signal generator to generate the one or more triggering signals when the imminent discharge sensor senses motion indicative of an imminent weapon discharge, and wherein the activation processor causes the one or more triggering signals to be sent to the one or more acoustic decoys by the transmitter. In an embodiment, the activation module can be programmed to cause the one or more triggering signals to be sent to the one or more acoustic decoys by the transmitter at different times after the imminent discharge sensor senses motion indicative of the imminent weapon discharge. In another embodiment, the activation module can be programmed to cause a broadcast triggering signal to be sent to a plurality of acoustic decoys after the imminent discharge sensor senses motion indicative of the imminent weapon discharge. The activation module may also cause the signal generator to generate a unique triggering signal for each of the one or more acoustic decoys, and the activation module may be field programmable.

An acoustic decoy may include a decoy processor, a sound generating module capable of producing a weapon discharge sound, and a receiver connected to an antenna. The decoy processor causes the sound generating module to produce the weapon discharge sound when the receiver receives a triggering signal through the antenna. The sound generating module may comprise a digital waveform module, an amplifier, and a speaker. The digital waveform module may have a plurality of digital waveforms, each digital waveform corresponding to a different weapon discharge sound, and further comprising a selector for selecting the weapon discharge sound to be played when the triggering signal is received. In an embodiment, the digital waveform module may comprise a first sound for mimicking distance effects or a second sound for producing a deliberate incorrect location of a shooter. The sound generating module may comprise a chamber to receive a blank cartridge and a firing mechanism. The sound generating module may further comprise a magazine for holding a plurality of blank cartridges.

An activation module for an acoustic decoy may comprise an activation processor, an imminent discharge sensor for sensing motion indicative of imminent discharge of a weapon, a signal generator, and a transmitter. The activation processor causes the signal generator to generate a triggering signal when the imminent discharge sensor senses motion indicative of an imminent weapon discharge, and the activation processor causes the triggering signal to be sent to the acoustic decoy by the transmitter. The activation module can be programmed to cause the triggering signal to be sent to the acoustic decoy by the transmitter at different times after the imminent discharge sensor senses motion indicative of the imminent weapon discharge. The activation module can also be programmed to cause a plurality of triggering signals to be sent to a plurality of acoustic decoys after the imminent discharge sensor senses motion indicative of the imminent weapon discharge.

A method for concealing a shooter's location may comprise providing the shooter a weapon including an activation module comprising an imminent discharge sensor for sensing movement indicative of an imminent discharge of the weapon and a signal generator for generating one or more triggering signals. Then one or more acoustic decoys are deployed to locations other than the shooter's location, wherein one or more of acoustic decoys is capable of producing weapon discharge sounds upon receipt of the one or more triggering signals. If movement indicative of the imminent discharge of the weapon is sensed by the imminent discharge sensor, one or more triggering signals are transmitted from the weapon to the one or more acoustic decoys, thereby causing the one or more acoustic decoys to produce the weapon discharge sounds and concealing the shooter's location.

The method for concealing a shooter's location may further comprise programming the activation module to cause the one or more triggering signals to be sent to the one or more acoustic decoys at different times after movement indicative of the imminent discharge of the weapon is sensed by the imminent discharge sensor, thereby causing the one or more acoustic decoys to produce weapon discharge sounds at different times. The method for concealing a shooter's location may also further comprise programming each of the one or more acoustic decoys to produce a particular weapon discharge sound. In the method, transmitting the one or more triggering signals comprises transmitting a separate triggering signal to each of the one or more acoustic decoys. In another embodiment, transmitting the one or more triggering signals comprises broadcasting a single triggering signal to all of the one or more acoustic decoys, wherein the single triggering signal includes a unique ID for each of the one or more acoustic decoys.

DETAILED DESCRIPTION

An acoustic decoy system is disclosed that comprises an acoustic decoy and an activation module of a weapon that may remotely trigger the acoustic decoy to produce a weapon discharge sound. One or more acoustic decoys are placed at locations proximate to a shooter. An activation module is attached or integral to a shooter's weapon, and comprises a sensor that senses movement indicative of the imminent discharge of the shooter's weapon, a signal generator that may generate a triggering signal based upon the sensed movement, and a transmitter for transmitting the triggering signal to one or more acoustic decoys.

Figure 1:
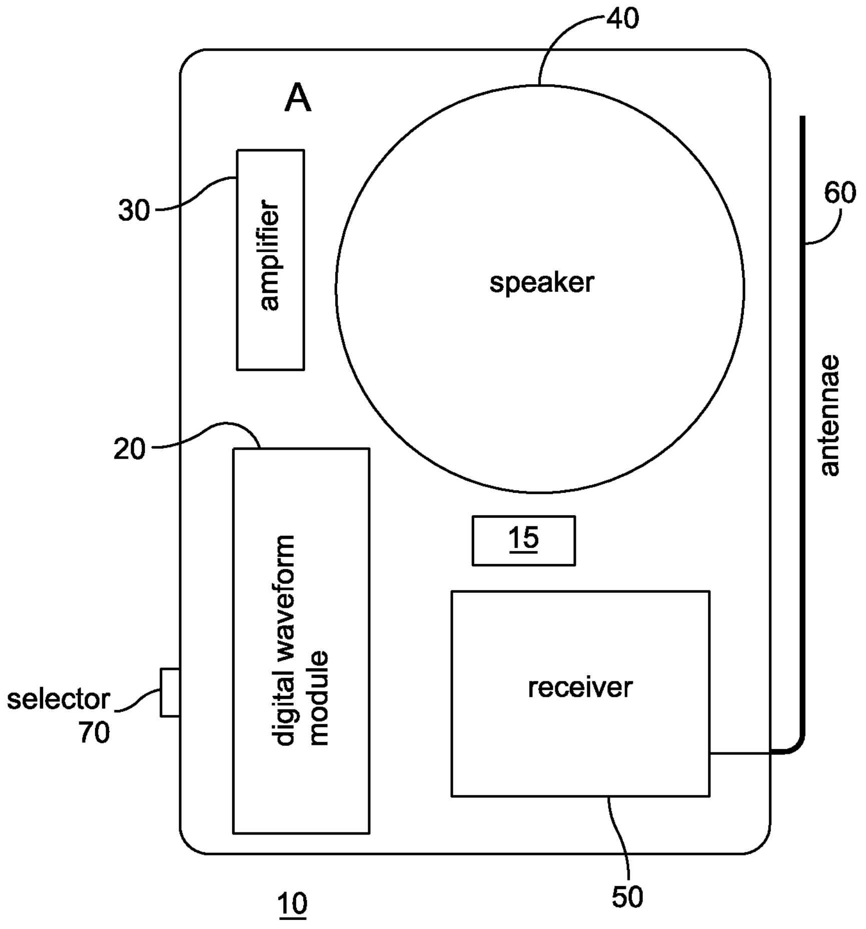
FIG. 1 is an embodiment of an acoustic decoy.

FIG. 1 shows an embodiment of an acoustic decoy 10 that uses a digital reproduction of a weapon discharge sound to generate a decoy sound. In this embodiment, the acoustic decoy comprises a decoy processor 15, a digital waveform module 20, an amplifier 30, a speaker 40, a receiver 50, an antenna 60, and a selector 70. Upon receipt of a triggering signal from an activation module by the antenna 60 and receiver 50, the processor 15 causes a sounds clip from the digital waveform module 20 to be amplified by amplifier 30 so it may be played over speaker 40. In an embodiment, the digital waveform module 20, amplifier 30, and speaker 40 comprise a sound generating module.

The processor 15 of acoustic decoy 10 of FIG. 1 controls the functions of the acoustic decoy 10. "Processor", as used herein, generally refers to a circuit arrangement that may be contained on one or more silicon chips, and/or integrated circuit (IC) boards, and that contains a Central Processing Unit (CPU). The CPU may generally include an arithmetic logic unit (ALU), which performs arithmetic and logical operations, and a control unit, which extracts instructions from memory and decodes and executes them, calling on the ALU when necessary. The processor 15 of acoustic decoy 10 includes programming that causes the acoustic decoy 10 to perform its functions of receiving a signal trigger from a remote location and then playing a recorded sound. For example, processor 15 may receive a signal from the antenna 60 and receiver 50, and then in response it causes a sound clip from the digital waveform module 20 to be amplified by the amplifier 30 and then played over speaker 40. The processor 15 may also be response to inputs from the selector 70, which allows a user to select a particular sound to be played when the decoy is triggered.

The digital waveform module 20 contains memory for storing digital waveforms, such as one or more weapon discharge sound digital waveforms (weapon discharge sound digital waveform). In addition, one or more memory devices (not shown) other than the digital waveform module, may also be in communication with the processor 15. Memory devices may be configured to store, for example, discharge sounds or instructions executable by the processor 15 for allowing a user to field program discharge sounds into the device. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. A DC power supply (not shown), such as a battery, may be provided for powering the processor 15 and all of the acoustic decoy components.

The use of the digital waveform module may give a shooter extensive flexibility when using the acoustic decoy. For example, the digital waveform module may be programmed to include a library of different weapon discharge sounds (a plurality of digital waveforms), with different weapon discharge sounds corresponding to different types of weapons and ammunition that a shooter might use, with different dispersion and reflection sounds to imitate distance effects, and with sounds configured to produce deliberate incorrect location for the shooter. The acoustic decoy may include a selector 70 to allow a shooter to pick the exact type of sound they would like to use for a particular situation. The selector may be something as simple as a knob on the acoustic decoy that allows a shooter to select from a number of sounds, or the selector may be more sophisticated such as a display screen with menus and appropriate buttons that allow a shooter to toggle through menus to select the sound the shooter would like to use.

In one embodiment, the digital waveform module 20 is preprogrammed to include digital waveforms for different types of weapons discharge sounds. In another embodiment, the digital waveform module 20 may be field programmable so that the acoustic decoy has a port that allows it to be connected to a laptop or other type of computer, which will allow a user to load different types of waveforms to the module. Alternatively, the digital waveform module 20 may include wireless capability (e.g., Bluetooth or wifi) that allows it to be programmed without a physical port or wire being needed. In a further embodiment, the digital waveform module may include a microphone for recording a live weapon discharge that a user desires to save for later selection and use.

Figure 2:
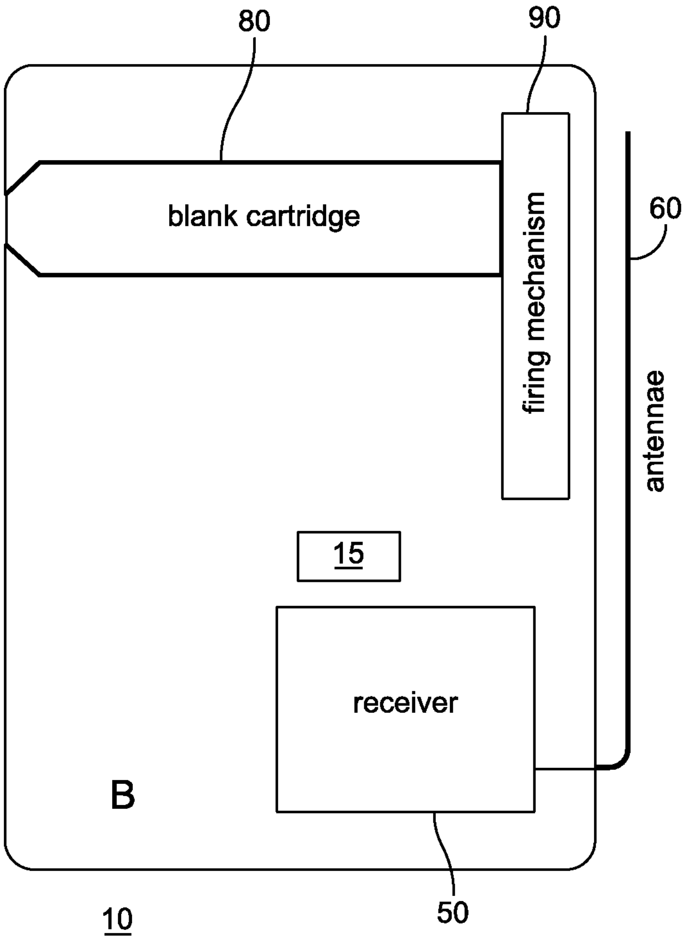
FIG. 2 is another embodiment of an acoustic decoy.

FIG. 2 shows an embodiment of an acoustic decoy 10 that uses a blank ammunition round to generate a weapon discharge sound. In this embodiment, the acoustic decoy includes a chamber for a blank cartridge 80, a firing mechanism 90, a receiver 50, an antenna 60, and a decoy processor 15. This embodiment differs from the embodiment of FIG. 1 in that the weapon discharge sound is generated by firing an actual blank round (cartridge) to create the sound rather than creating the sound electronically as in the embodiment of FIG. 1. The blank round may be a blank cartridge made specifically for the weapon that is being emulated. In an embodiment, the blank cartridge may be a cartridge made specifically for an acoustic decoy, and may differ in size or shape from an actual cartridge for the weapon being emulated. In an embodiment, the chamber for a blank cartridge 80 and the firing mechanism comprise a sound generating module.

In the embodiment of an acoustic decoy 10 of FIG. 2, after a triggering signal from an activation module is received by antenna 60 and receiver 50, the processor 15 causes firing mechanism 90 to discharge a blank cartridge in the chamber 80. In one embodiment, the cartridge is a blank round that has the same sound characteristics of the ammunition being used by the shooter. This embodiment could help prevent an enemy from identifying the location of the shooter by screening out decoy sounds that are not representative of a discharge from an actual weapon. In another embodiment, the acoustic decoy of FIG. 2 includes a magazine (not shown) that may hold a plurality of blank cartridges or rounds, so that the decoy may be used multiple times without having to reload it with blanks; in this embodiment the chamber and magazine may be configured similarly to a weapon so that used blanks are discharged after a blank round has been fired. Alternatively, the magazine may have a "revolver" design that causes the revolver to turn to a new blank after a previous blank is discharged. The acoustic device 10 may include memory (not shown) that is used by the processor 15.

The acoustic decoys of FIGS. 1 and 2 have a straightforward design that may be implemented in a small enclosure. This is useful as it allows the shooter to carry a number of decoys, for placement around the shooter before shooting. The enclosures for the decoys may be ruggedized for use in any type of weather condition and to withstand rough and daily use. The enclosures may also include mounting provisions that allow the decoys to be mounted on horizontal or vertical surfaces as desired. Such mounting provisions may include mounting tabs with screw holes or keyholes in the back of the decoys for mounting using screws or nails, or any other known method that is used to mount boxes on different types of surfaces. Mounting of the decoy of FIG. 2 will have to be strong enough to withstand the recoil caused by the discharge of an actual blank round by the decoy.

Figure 3:
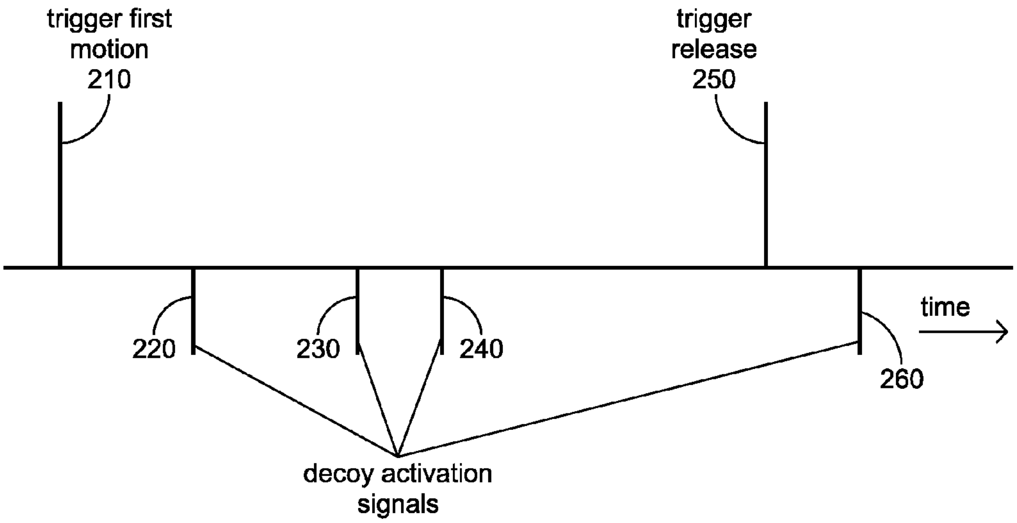
FIG. 3 depicts a triggering sequence that may be used with an acoustic decoy.

FIG. 3 shows a triggering sequence that may be used with the activation module of the acoustic decoy system. The activation module (not shown) may be a separate device that is attached to a weapon or it may be integral to the weapon. As noted, the activation module includes a imminent discharge sensor that senses movement indicative of imminent discharge of the shooter's weapon, a signal generator that may be used to generate a triggering signal when movement is sensed, and a transmitter for transmitting the triggering signal to one or more acoustic decoys (a plurality of acoustic decoys). The activation module may include a processor (the activation processor) that oversees the functions of the activation module. The processor monitors the imminent discharge sensor for movement indicative of imminent weapon discharge and causes the signal generator to generate a triggering signal in response to the movement, and then causes the transmitter to transmit the triggering signal to decoys.

The imminent discharge sensor can be any sensor that is capable of sensing the imminent discharge of the weapon. For example, the imminent discharge sensor can be a sensor that monitors the trigger for movement, or in another embodiment the imminent discharge sensor can be sensor that senses movement of a hammer, striker, or firing pin. As will be understood by those skilled in the art, the hammer, striker, or firing pin are coupled to the trigger through a trigger mechanism that translates trigger movement through other parts of the trigger mechanism to the hammer, striker, or firing pin. In another embodiment, the imminent discharge sensor can be a sensor that monitors any part of the trigger mechanism for a weapon that moves when the trigger is pulled, such as sears, pivot arms, and linkages that are present in weapon trigger mechanisms. Specifically, the imminent discharge sensor may be a mechanical, optical, inductance, or any other sensor that can sense displacement and which can be conveniently mounted on a weapon. As will be understood, the ruggedness and sensitivity of the sensor, as well as whether the sensor is internally or externally mounted on a weapon, are factors considered in the selection of the appropriate type of sensor.

In one embodiment, the activation module is programmable. Specifically, the activation module may be programmable so that a user may program when, after the start of motion indicative of a weapon discharge, the triggering signal is generated and then transmitted by the transmitter. In an embodiment, this may be accomplished by programming delay times for triggering signal generation after the first motion is sensed; any delay time may be programmed. For example, in one embodiment a shooter could program the activation module with a long delay so that the triggering signal is not generated and transmitted until after the trigger of the shooter's own weapon has been fully released (i.e., the shooter has discharged his or her own weapon). This embodiment corresponds to the decoy activation signal 260 in FIG. 3, which is after trigger release 250. A shooter who does not want to be distracted by the sound of an acoustic decoy might choose this embodiment.

In another embodiment, a shooter could program the activation module with short delays so that one or a plurality of acoustic decoys are triggered after the first trigger motion but before the shooter has fully released the trigger on his or her own weapon. This embodiment corresponds to decoy activation signals 220, 230, and 240 in FIG. 3, in which the activation signals are after the first trigger motion 210 but before full trigger release 250. A shooter in a highly risky position might choose this option to provide maximum acoustic confusion to the enemy. In another embodiment, triggers both before and after full release of the shooter's trigger might be warranted to provide maximum acoustic cover. In yet another embodiment, the activation module may be programmed for simultaneous triggering signal generation and transmission of a plurality of triggering signals, so that multiple acoustic decoys are triggered at the same time.

In an embodiment, the signal generator of the activation module may be capable of producing a plurality of different triggering signals so that a plurality of different acoustic decoys may be triggered individually. The signal generator may produce unique triggering signals that differ in frequency, waveform, or other characteristics, and the receiver on each acoustic decoy is designed to respond to only a particular type of signal. In that manner, each acoustic decoy may be triggered individually. In another embodiment, each acoustic decoy has its own unique ID, and the signal generator produces a single broadcast signal that is received by all of the decoys. The broadcast signal contains instructions for each decoy based on the unique ID, allowing for each decoy to be triggered with instructions specific to that decoy. For example, if a user would like decoy 1 to fire first, then decoy 3, then decoy 2, a single broadcast message from the activation device on the weapon could tell each decoy its delay or the order of firing, and then the processor on each decoy acts accordingly. In another example, if the user would like all of the decoys to fire at the same time, a single broadcast message from the activation device could send each decoy the same instructions (e.g., the same delay time) so that simultaneous firing occurs.

Thus, each acoustic decoy may be triggered individually, giving a user flexibility in using different methods to confuse and mislead acoustic location systems that are trying to identify the location of a shooter. For example, the activation module may be programmed to cause simultaneous firing of the acoustic decoys from a number of locations. By way of further example, the activation module may be programmed so that the acoustic decoys discharge with different dispersion and reflection patterns to imitate distance effects which cause an acoustic location system to identify a definite, but incorrect, location of the shooter. Alternatively, the activation module may be programmed so that some or all of the acoustic decoys discharge before the actual discharge by the shooter (pre-firing).

As will the understood, a system comprising an activation module that can trigger a remotely located acoustic decoy may be configured in a number of different ways. In an embodiment, the delay times may be programmed into the decoys rather than having the activation module send separate trigger signals at different delay times. For example, if a delay time is programmed into the memory of each acoustic decoy, the activation module could then send a single trigger signal to all of the acoustic decoys, which would then cause the acoustic decoys to produce discharge sounds according to their delay programming. In another embodiment, the acoustic decoys and the activation module may have transceivers, which would give the acoustic decoys the ability to communicate with each other, and give the acoustic decoys the ability to communicate with the activation module. This embodiment could be useful for many different situations. For example, in an embodiment an acoustic decoy that can communicate with other decoys could have programming that allows it to be used to remotely program other decoys that have already been deployed, which may be useful when time constraints do not allow for the other decoys to be retrieved and programmed. In another embodiment, having acoustic decoys that can communicate with each other could increase the distance at which a decoy can be placed from the activation module by allowing the decoys to pass along a trigger signal or instructions to a decoy that is too far to communicate directly with the activation module. Alternatively, the communication capability between acoustic decoys could be used to coordinate concealment sound patterns to be played by the decoys.

Figure 4:
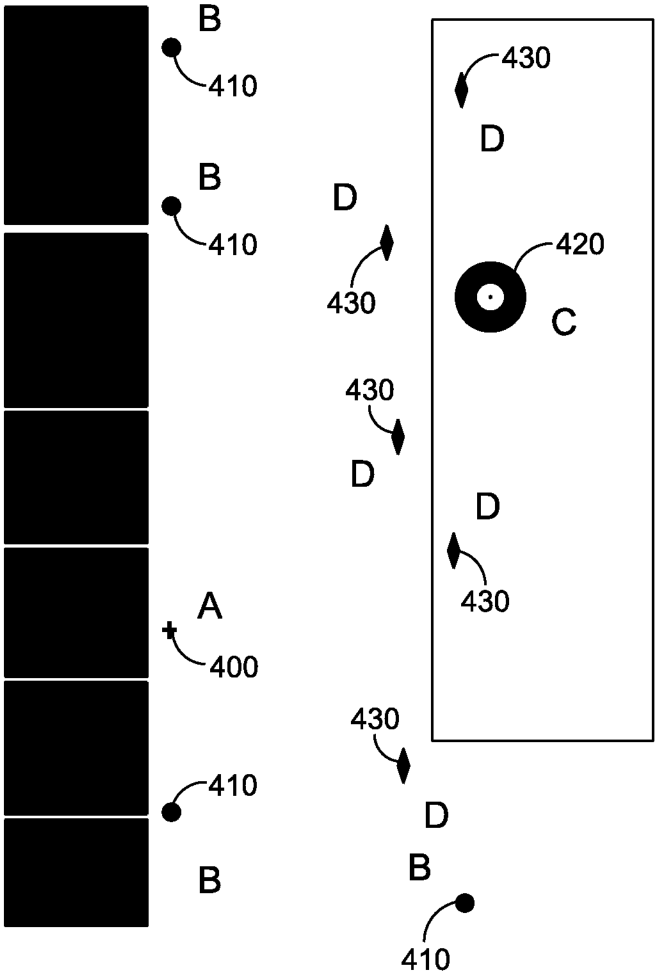
FIG. 4 is a plan view of an exemplary deployment of acoustic decoys.

FIG. 4 shows a plan view of an exemplary implementation of the invention. The true location of the shooter 400 is shown as A. Four acoustic decoys 410 are shown as elements B. The target 420 is shown as element C, and an acoustic sensor array 430 comprising elements D is shown. The acoustic sensor array 430 is designed to locate the position of shooters who might shoot at target 420 C. The acoustic decoys are spread and triggered by the activation device on the shooter's weapon, in accordance with programming by the shooter as to when each decoy is triggered. The purpose of the decoys is to confuse and/or misrepresent the location of the shooter so that the sensor array is effectively disabled as a location device.

As noted, the functions performed by the acoustic decoy and activation module described herein may be performed by a circuit board, microprocessor, logic, memory, and/or programming within the devices. On devices using changeable programming, the programming may be preprogrammed during production of the devices, or the devices may include appropriate ports or wireless connections that allow a user to program or change the programming on a device using a general purpose computer or alternatively a specially designed computer made for programming the devices. Communication between the acoustic decoy and activation decoy may be performed by known wireless methods and protocols using transmitters, receivers, transceivers, and antennas known in the prior art.

A method for concealing a shooter's location may comprise providing the shooter a weapon including an activation module that has an imminent discharge sensor for sensing movement indicative of an imminent discharge of the weapon and a signal generator for generating one or more triggering signals. One or more acoustic decoys are deployed to locations other than the shooter's location, generally proximate to the shooter, wherein one or more of acoustic decoys is capable of producing weapon discharge sounds upon receipt of the one or more triggering signals. If movement indicative of the imminent discharge of the weapon is sensed by the imminent discharge sensor, one or more triggering signals are transmitted from the weapon to the one or more acoustic decoys, which causes the one or more acoustic decoys to produce the weapon discharge sounds, which help to obscure the shooter's location.

The method for concealing a shooter's location may further include programming the activation module to cause the one or more triggering signals to be sent to the one or more acoustic decoys at different times after movement indicative of the imminent discharge of the weapon is sensed by the imminent discharge sensor, thereby causing the one or more acoustic decoys to produce weapon discharge sounds at different times. As discussed above, in an embodiment the activation device may be programmed to use different delay times for transmitting the trigger signals. The method for concealing a shooter's location may also further comprise programming each of the one or more acoustic decoys to produce a particular weapon discharge sound, such as reflections or dispersion sounds that mimic a distance effect. In an embodiment of the method, transmitting the one or more triggering signals comprises transmitting a separate triggering signal to each of the one or more acoustic decoys. In another embodiment, transmitting the one or more triggering signals comprises broadcasting a single triggering signal to all of the one or more acoustic decoys. As disclosed, broadcasting a single triggering signal is possible if a unique ID is used for each decoy so that each decoy knows which instructions in the broadcast signal apply to the decoy.

The features of the acoustic decoy system have been disclosed, and further variations will be apparent to persons skilled in the art. All such variations are considered to be within the scope of the appended claims. Reference should be made to the appended claims, rather than the foregoing specification, as indicating the true scope of the disclosed invention.

The features of FIGS. 1-4 are not exclusive. Other structures may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. Any of the functions performed by the devices of FIGS. 1 and 2 may be implemented in hardware, software or a combination of both.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An acoustic decoy system comprising:

an activation module operatively coupled to a weapon, said activation module having an imminent discharge sensor for sensing movement indicative of an imminent discharge of the weapon, and a transmitter for transmitting one or more triggering signals, one or more remote acoustic decoys located remotely from the activation module, said one or more remote acoustic decoys being capable of producing weapon discharge sounds, and at least one of the one or more remote acoustic decoys including an antenna and a receiver connected to the antenna for receiving one or more triggering signals via the antenna;

wherein the activation module is configured to transmit, via the transmitter, the one or more triggering signals from the weapon to the one or more remote acoustic decoys after the imminent discharge sensor senses movement indicative of the imminent discharge of the weapon, thereby causing the one or more remote acoustic decoys to produce the weapon discharge sounds.

2. The acoustic decoy system of claim 1, wherein at least one of the one or more remote acoustic decoys further comprises:

a decoy processor;

a digital waveform module;

an amplifier; and a speaker;

wherein the decoy processor is configured to cause a weapon discharge sound digital waveform from the digital waveform module to be amplified by the amplifier and then played over the speaker when the receiver receives the one of the one or more triggering signals through the antenna.

3. The acoustic decoy system of claim 2, wherein the digital waveform module has a plurality of digital waveforms, each waveform corresponding to a different weapon discharge sound, and further comprising a selector for selecting the weapon discharge sound to be played when one of the one or more triggering signals is received.

4. The acoustic decoy system of claim 2, wherein the digital waveform module comprises a first sound for mimicking distance effects or a second sound producing a deliberate incorrect location of a shooter.

5. The acoustic decoy system of claim 1, wherein at least one of the one or more remote acoustic decoys comprises:

a decoy processor;

a chamber to receive a blank cartridge; and a firing mechanism;

wherein the decoy processor is configured to cause the firing mechanism to discharge the blank cartridge in the chamber when the receiver receives the one of the one or more triggering signals through the antenna.

6. The acoustic decoy system of claim 5, wherein the at least one of the one or more remote acoustic decoys further comprises a magazine for holding a plurality of blank cartridges.

7. The acoustic decoy system of claim 1, wherein the activation module further comprises:

an activation processor; and a signal generator;

wherein the activation processor is configured to cause the signal generator to generate the one or more triggering signals when the imminent discharge sensor senses motion indicative of an imminent weapon discharge, and wherein the activation processor causes the one or more triggering signals to be sent to the one or more remote acoustic decoys by the transmitter.

8. The acoustic decoy system of claim 7, wherein the activation module is configured to cause the one or more triggering signals to be sent to the one or more remote acoustic decoys by the transmitter at different times after the imminent discharge sensor senses motion indicative of the imminent weapon discharge.

9. The acoustic decoy system of claim 7, wherein the activation module is configured to cause a broadcast triggering signal to be sent to a plurality of remote acoustic decoys after the imminent discharge sensor senses motion indicative of the imminent weapon discharge.

10. The acoustic decoy system of claim 7, wherein the activation module is configured to cause the signal generator to generate a unique triggering signal for each of the one or more remote acoustic decoys.

11. The acoustic decoy system of claim 7, wherein the activation module is field programmable.

12. An acoustic decoy comprising:

a sound generating module capable of producing a weapon discharge sound;

a receiver connected to an antenna; and a decoy processor configured to cause the sound generating module to produce the weapon discharge sound when the receiver receives through the antenna a triggering signal transmitted by an activation module for a weapon remotely located from the acoustic decoy.

13. The acoustic decoy of claim 12, wherein the sound generating module comprises:

a digital waveform module;

an amplifier; and a speaker.

14. The acoustic decoy of claim 13, wherein the digital waveform module has a plurality of digital waveforms, each digital waveform corresponding to a different weapon discharge sound, and further comprising a selector for selecting the weapon discharge sound to be played when the triggering signal is received.

15. The acoustic decoy of claim 13, wherein the digital waveform module comprises a first sound for mimicking distance effects or a second sound for producing a deliberate incorrect location of a shooter.

16. The acoustic decoy of claim 12, wherein the sound generating module comprises:

a chamber to receive a blank cartridge; and a firing mechanism.

17. The acoustic decoy of claim 16, wherein the sound generating module further comprises a magazine for holding a plurality of blank cartridges.

18. An activation module for a weapon, for an acoustic decoy system, comprising:

an activation processor;

an imminent discharge sensor for sensing motion indicative of imminent discharge of a weapon;

a signal generator; and a transmitter;

wherein the activation processor is configured to cause the signal generator to generate a triggering signal when the imminent discharge sensor senses motion indicative of an imminent weapon discharge, and wherein the activation processor is further configured to cause the triggering signal to be sent by the transmitter to a remote acoustic decoy remotely located from the activation module.

19. The activation module of claim 18, wherein the activation module is configured to cause the triggering signal to be sent to the remote acoustic decoy by the transmitter at different times after the imminent discharge sensor senses motion indicative of the imminent weapon discharge.

20. The activation module of claim 18, wherein the activation module is configured to cause a plurality of triggering signals to be sent to a plurality of remote acoustic decoys after the imminent discharge sensor senses motion indicative of the imminent weapon discharge.

21. A method for concealing a shooter's location comprising:

providing the shooter a weapon including an activation module comprising an imminent discharge sensor for sensing movement indicative of an imminent discharge of the weapon, a signal generator for generating one or more triggering signals, and a transmitter for transmitting the one or more triggering signals;

deploying, to locations remotely located from the shooter's location, one or more remote acoustic decoys capable of producing weapon discharge sounds upon receipt of the one or more triggering signals, at least one of said one or more remote acoustic decoys including an antenna and a receiver connected to the antenna for receiving the one or more triggering signals via the antenna; and transmitting, by the activation module transmitter, the one or more triggering signals from the weapon to the one or more remote acoustic decoys if movement indicative of the imminent discharge of the weapon is sensed by the imminent discharge sensor, thereby causing the one or more remote acoustic decoys to produce the weapon discharge sounds and concealing the shooter's location.

22. The method of claim 21, wherein transmitting, by the activation module transmitter, the one or more triggering signals from the weapon to the one or more remote acoustic decoys comprises transmitting the one or more triggering signals from the weapon to the one or more remote acoustic decoys at different times after movement indicative of the imminent discharge of the weapon is sensed by the imminent discharge sensor, thereby causing the one or more remote acoustic decoys to produce weapon discharge sounds at different times.

23. The method of claim 21, wherein each of the deployed one or more remote acoustic decoys is configured to produce a particular weapon discharge sound.

24. The method of claim 21, wherein transmitting the one or more triggering signals comprises transmitting a separate triggering signal to each of the one or more remote acoustic decoys.

25. The method of claim 21, wherein transmitting the one or more triggering signals comprises broadcasting a single triggering signal to all of the one or more remote acoustic decoys, wherein the single triggering signal includes a unique ID for each of the one or more remote acoustic decoys.

26. A system comprising:

an imminent discharge sensor operably connected to a firearm and configured to sense trigger movement of said firearm indicative of an imminent discharge of the firearm; and a transmitter, responsive to said imminent discharge sensor sensing trigger movement, for transmitting, prior to actual discharge of said firearm, a trigger signal for receipt by one or more electronic devices located generally proximate to said firearm but remote therefrom;

wherein the one or more remote electronic devices are configured to emit weapon discharge sounds in response to receipt of said transmitter trigger signal, thereby obscuring the location of the sound of actual discharge of said firearm.

* * * * *